United States Patent
Hammoud

(10) Patent No.: US 8,959,424 B2
(45) Date of Patent: Feb. 17, 2015

(54) COMPARATIVE AND ANALYTIC LENS FOR DISPLAYING A WINDOW WITH A FIRST COLUMN FOR FIRST DATA AND A SECOND COLUMN FOR COMPARISON VALUES OF THE FIRST DATA AND SECOND DATA

(75) Inventor: Amer Hammoud, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/171,156

(22) Filed: Jun. 28, 2011

(65) Prior Publication Data

US 2013/0007583 A1    Jan. 3, 2013

(51) Int. Cl.
G06F 17/00 (2006.01)
G06F 17/18 (2006.01)
G06F 17/30 (2006.01)
G06F 17/24 (2006.01)

(52) U.S. Cl.
CPC .................................. *G06F 17/246* (2013.01)
USPC .......................... 715/212; 715/215; 715/219

(58) Field of Classification Search
CPC ... G06Q 30/0201; G06Q 40/06; G06Q 40/12; G06F 17/30554; G06F 17/30; G06F 17/30716; G06F 17/30905
USPC .......................................... 715/212, 215, 219
See application file for complete search history.

(56) References Cited

U.S. PATENT DOCUMENTS

| | | | |
|---|---|---|---|
| 5,844,572 A * | 12/1998 | Schott ............................ 345/440 |
| 6,496,832 B2 | 12/2002 | Chi et al. |
| 6,988,241 B1 | 1/2006 | Guttman et al. |
| 7,640,496 B1 | 12/2009 | Chaulk et al. |
| 7,698,287 B2 | 4/2010 | Becker et al. |
| 7,802,182 B2 | 9/2010 | Bales |
| 7,873,526 B2 | 1/2011 | Iwasa et al. |
| 7,877,465 B2 | 1/2011 | Kontamsetty et al. |
| 2001/0017622 A1* | 8/2001 | Patel et al. ..................... 345/418 |
| 2003/0188258 A1 | 10/2003 | Aureglia et al. |
| 2006/0061597 A1 | 3/2006 | Hui |
| 2006/0167757 A1* | 7/2006 | Holden et al. .................. 705/26 |
| 2007/0220416 A1* | 9/2007 | Mitsui ........................... 715/503 |
| 2008/0010605 A1 | 1/2008 | Frank |
| 2008/0115076 A1 | 5/2008 | Frank et al. |
| 2009/0063960 A1* | 3/2009 | Anwar .......................... 715/255 |
| 2009/0070744 A1 | 3/2009 | Taylor et al. |

(Continued)

OTHER PUBLICATIONS

U.S. Appl. No. 13/171,188, entitled "Drill-Through Lens", filed Jun. 28, 2011, invented by A. Hammond, 31 pp. (54.61).

(Continued)

*Primary Examiner* — Adam M Queler
*Assistant Examiner* — Ariel Mercado
(74) *Attorney, Agent, or Firm* — Janaki K. Davda; Konrad, Raynes, Davda and Victor LLP

(57) ABSTRACT

Provided are techniques for comparing data. User selection of first data to be compared is received. User input of one or more formulas used in making comparisons is received. The user is allowed to move a Comparative and Analytic (CA) lens window to float over second data, wherein the CA lens window displays a floating, transparent document. In response to the CA lens floating over the second data, in real-time, the first data and the second data are compared according to the one or more formulas, and the CA lens window is displayed showing the first data and the comparison between the first data and the second data.

18 Claims, 17 Drawing Sheets

(56) References Cited

U.S. PATENT DOCUMENTS

| | | | | |
|---|---|---|---|---|
| 2009/0327851 | A1* | 12/2009 | Raposo | 715/213 |
| 2010/0034442 | A1 | 2/2010 | Minakuchi et al. | |
| 2010/0107062 | A1 | 4/2010 | Bacus et al. | |
| 2010/0174678 | A1 | 7/2010 | Massand | |
| 2011/0209048 | A1* | 8/2011 | Scott et al. | 715/236 |
| 2012/0084644 | A1 | 4/2012 | Robert et al. | |

OTHER PUBLICATIONS

Wikipedia, "Spreadsheet", [online], Last Modified on Jun. 7, 2011, [Retrieved on Jun. 8, 2011], retrieved from the Internet at <URL: http://en.wikipedia.org/wiki/Spreadsheet>, 23 pp.

Response to Office Action, dated May 9, 2013, for U.S. Appl. No. 13/171,188, filed Jun. 28, 2011, entitled "Drill-Through Lens", invented by Amer Hammoud et al., pp. 1-16.

"Hover Preview Card", [online], [retrieved on Jun. 14, 2011], updated on May 17, 2011. Retrieved from the Internet at <URL: http://dleadt.torolab.ibm.com/uxd/getMLpage.jsp?ml=101189>, Total 6 pp.

Office Action 1, Feb. 6, 2013, for U.S. Appl. No. 13/171,188, filed Jun. 28, 2011 by A. Hammoud, Total 22 pp. [54.61 (OA1)].

Final Office Action, dated Dec. 18, 2013 for U.S. Appl. No. 13/171,188, entitled, "Drill-Through Lens for Generating Different Types of Reports", invented by A. Hammoud et al., pp. 1-23.

Response to Final Office Action, dated Mar. 18, 2013, for U.S. Appl. No. 13/171,188, entitled, "Drill-Through Lens for Generating Different Types of Reports", invented by A. Hammoud et al., pp. 1-12.

Notice of Allowance, dated Oct. 7, 2014, for U.S. Appl. No. 13/171,188 (54.61), filed Jun. 28, 2011 by inventor A. Hammoud et al., Total 13 pages.

* cited by examiner

FIG. 5

| | A | B | C | D | E | |
|---|---|---|---|---|---|---|
| 1 | Revenue | 2004 | 2005 | 2006 | 2004 | compare |
| 2 | Apple | 80,000 | 90,000 | 100,00 | 80,000 | -20,000 |
| 3 | Crabapple | 790,000 | 792,000 | 794,00 | 790,000 | -4,000 |
| 4 | Hawthorn | 180,000 | 170,000 | 160,00 | 180,000 | 20,000 |
| 5 | Pear | 610,000 | 650,000 | 610,00 | 610,000 | 0 |
| 6 | Apricot | 300,000 | 250,000 | 300,00 | 300,000 | 0 |
| 7 | Peach | 99,061 | 127,286 | 142,75 | 99,061 | -43,691 |
| 8 | Nectarines | 6,500 | 16,500 | 26,50 | 6,500 | -20,000 |
| 9 | Plum | 4,000 | 8,000 | 16,00 | 4,000 | -12,000 |
| 10 | Cherry | 50,000 | 51,000 | 50,50 | 50,000 | -500 |
| 11 | Blackberry | 51,000 | 52,000 | 51,50 | 51,000 | -500 |
| 12 | Raspberry | 51,000 | 52,000 | 51,50 | 51,000 | -500 |
| 13 | Mulberry | 99,943 | 42,102 | 31,51 | 99,943 | 68,427 |
| 14 | Strawberry | 201,598 | 276,016 | 355,02 | 201,598 | -153,427 |
| 15 | Cranberry | 300,000 | 250,000 | 200,00 | 300,000 | 100,000 |
| 16 | Blueberry | 290,000 | 200,000 | 120,00 | 290,000 | 170,000 |
| 17 | Barberry | 219,540 | 222,621 | 203,90 | 219,540 | 15,635 |
| 18 | Currant | 203,265 | 253,331 | 301,29 | 203,265 | -98,026 |
| 19 | Gooseberry | 240,000 | 270,000 | 300,00 | 240,000 | -60,000 |
| 20 | Elderberry | 150,000 | 50,000 | 150,00 | 150,000 | 0 |

|   | A | B | C | D | E | |
|---|---|---|---|---|---|---|
| 1 | Revenue | 2004 | 2005 | 2006 | 2004 | compare |
| 2 | Apple | 80,000 | 90,000 | 100,00 | 80,000 | ↘ -20,000 |
| 3 | Crabapple | 790,000 | 792,000 | 794,00 | 790,000 | ↘ -4,000 |
| 4 | Hawthorn | 180,000 | 170,000 | 160,00 | 180,000 | ↗ 20,000 |
| 5 | Pear | 610,000 | 650,000 | 610,00 | 610,000 | 0 |
| 6 | Apricot | 300,000 | 250,000 | 300,00 | 300,000 | 0 |
| 7 | Peach | 99,061 | 127,286 | 142,75 | 99,061 | ↘ -43,691 |
| 8 | Nectarines | 6,500 | 16,500 | 26,50 | 6,500 | ↘ -20,000 |
| 9 | Plum | 4,000 | 8,000 | 16,00 | 4,000 | ↘ -12,000 |
| 10 | Cherry | 50,000 | 51,000 | 50,50 | 50,000 | ↘ -500 |
| 11 | Blackberry | 51,000 | 52,000 | 51,50 | 51,000 | ↘ -500 |
| 12 | Raspberry | 51,000 | 52,000 | 51,50 | 51,000 | ↘ -500 |
| 13 | Mulberry | 99,943 | 42,102 | 31,51 | 99,943 | ↗ 68,427 |
| 14 | Strawberry | 201,598 | 276,016 | 355,02 | 201,598 | ↘ -153,427 |
| 15 | Cranberry | 300,000 | 250,000 | 200,00 | 300,000 | ↗ 100,000 |
| 16 | Blueberry | 290,000 | 200,000 | 120,00 | 290,000 | ↗ 170,000 |
| 17 | Barberry | 219,540 | 222,621 | 203,90 | 219,540 | ↗ 15,635 |
| 18 | Currant | 203,265 | 253,331 | 301,29 | 203,265 | ↘ -98,026 |
| 19 | Gooseberry | 240,000 | 270,000 | 300,00 | 240,000 | ↘ -60,000 |
| 20 | Elderberry | 150,000 | 50,000 | 150,00 | 150,000 | 0 |

FIG. 6

| 702 | 704 | 706 | | 710 |
|---|---|---|---|---|
| 2004 | compare | compare indicator | | |
| 80000 | =A2-lens_selection | if < 0 then img1 | ; if > 0 then img2 | if = 0 then img3 |
| 790000 | =A3-lens_selection | if < 0 then img1 | ; if > 0 then img2 | if = 0 then img3 |
| 180000 | =A4-lens_selection | if < 0 then img1 | ; if > 0 then img2 | if = 0 then img3 |
| 610000 | =A5-lens_selection | if < 0 then img1 | ; if > 0 then img2 | if = 0 then img3 |
| 300000 | =A6-lens_selection | if < 0 then img1 | ; if > 0 then img2 | if = 0 then img3 |
| 99061 | =A7-lens_selection | if < 0 then img1 | ; if > 0 then img2 | if = 0 then img3 |
| 6500 | =A8-lens_selection | if < 0 then img1 | ; if > 0 then img2 | if = 0 then img3 |
| 4000 | =A9-lens_selection | if < 0 then img1 | ; if > 0 then img2 | if = 0 then img3 |
| 50000 | =A10-lens_selection | if < 0 then img1 | ; if > 0 then img2 | if = 0 then img3 |
| 51000 | =A11-lens_selection | if < 0 then img1 | ; if > 0 then img2 | if = 0 then img3 |
| 51000 | =A12-lens_selection | if < 0 then img1 | ; if > 0 then img2 | if = 0 then img3 |
| 99943 | =A13-lens_selection | if < 0 then img1 | ; if > 0 then img2 | if = 0 then img3 |
| 201598 | =A14-lens_selection | if < 0 then img1 | ; if > 0 then img2 | if = 0 then img3 |
| 300000 | =A15-lens_selection | if < 0 then img1 | ; if > 0 then img2 | if = 0 then img3 |
| 290000 | =A16-lens_selection | if < 0 then img1 | ; if > 0 then img2 | if = 0 then img3 |
| 219540 | =A17-lens_selection | if < 0 then img1 | ; if > 0 then img2 | if = 0 then img3 |
| 203265 | =A18-lens_selection | if < 0 then img1 | ; if > 0 then img2 | if = 0 then img3 |
| 240000 | =A19-lens_selection | if < 0 then img1 | ; if > 0 then img2 | if = 0 then img3 |
| 150000 | =A20-lens_selection | if < 0 then img1 | ; if > 0 then img2 | if = 0 then img3 |

| A | B |
|---|---|
| 8 | 15 |
| 2 | 20 |
| 3 | 9 |
| 4 | 11 |
| 6 | 5 |
| 2 | 9 |
| 3 | 13 |
| 1 | 5 |
| 20 | 5 |

=LOG(lens_selection,2)
=LOG(lens_selection,2)
=LOG(lens_selection,2)
=LOG(lens_selection,2)
=LOG(lens_selection,2)
=LOG(lens_selection,2)
=LOG(lens_selection,2)
=LOG(lens_selection,2)
=LOG(lens_selection,2)

| A | B | C |
|---:|---:|---:|
| 8 | 3 | 15 |
| 2 | 1 | 20 |
| 3 | 1.584963 | 9 |
| 4 | 2 | 11 |
| 6 | 2.584963 | 5 |
| 2 | 1 | 9 |
| 3 | 1.584963 | 13 |
| 1 | 0 | 5 |
| 20 | 4.321928 | 5 |

COMPARATIVE AND ANALYTIC LENS FOR DISPLAYING A WINDOW WITH A FIRST COLUMN FOR FIRST DATA AND A SECOND COLUMN FOR COMPARISON VALUES OF THE FIRST DATA AND SECOND DATA

CROSS-REFERENCE TO RELATED APPLICATION

This application is a non-provisional application that is related to application Ser. No. 13/171,188, entitled "DRILL-THROUGH LENS", filed on the same date herewith, which application is incorporated herein by reference in its entirety.

BACKGROUND

Embodiments of the invention relate to a comparative and analytic lens for comparing and/or analyzing data.

A user often needs to compare data in a spreadsheet with other data in the same or another spreadsheet or report. For comparing data in the same spreadsheet, a user typically uses a split view, adds extra calculation columns to the spreadsheet, or runs a new, different report that compares the two reports together.

SUMMARY

Provided are a method, computer program product, and system for comparing data. User selection of first data to be compared is received. User input of one or more formulas used in making comparisons is received. The user is allowed to move a Comparative and Analytic (CA) lens window to float over second data, wherein the CA lens window displays a floating, transparent document. In response to the CA lens floating over the second data, in real-time, the first data and the second data are compared according to the one or more formulas, and the CA lens window is displayed showing the first data and the comparison between the first data and the second data.

BRIEF DESCRIPTION OF THE SEVERAL VIEWS OF THE DRAWINGS

Referring now to the drawings in which like reference numbers represent corresponding parts throughout:

FIG. 5 illustrates a CA lens window in accordance with certain embodiments.

FIG. 6 illustrates user of graphic icons to enhance comparison in accordance with certain embodiments.

FIG. 7 illustrates a CA configuration window in accordance with certain embodiments.

FIG. 9 illustrates a spreadsheet in accordance with certain embodiments.

FIG. 10 illustrates a CA configuration window in accordance with certain embodiments.

FIG. 13 illustrates insertion of a new column in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
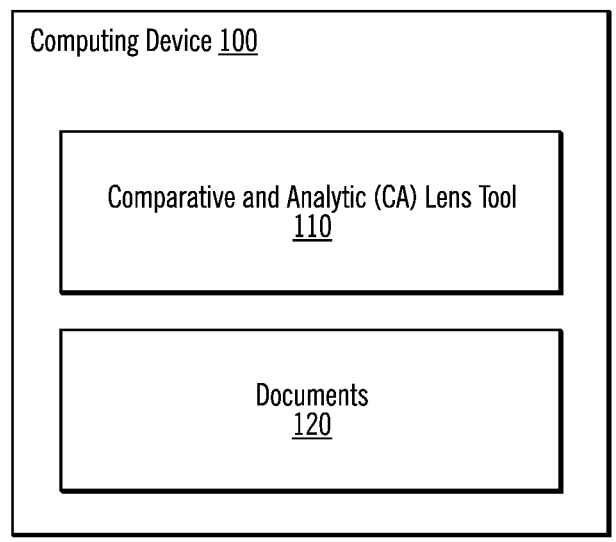
FIG. 1 illustrates, in a block diagram, a computing device with a Comparative and Analytic (CA) lens tool in accordance with certain embodiments.

FIG. 1 illustrates, in a block diagram, a computing device 100 with a Comparative and Analytic (CA) lens tool 110 in accordance with certain embodiments. The computing device 100 also includes documents 120 (e.g., spreadsheets, reports, cross tabulations, lists, etc). The CA lens tool 110 may operate in comparison mode or in analytic mode. In comparison mode, the CA lens tool 110 compares data within a document or between two documents. In analytic mode, the CA lens tool 110 performs a calculation of data within a document or between two documents. Thus, the CA lens tool 110 may be used for analysis, as well as, comparison. In certain embodiments, the CA lens tool 110 enables the user to switch between the comparative and analytic modes (e.g., via a checkbox in a configuration window or other graphical user interface widget).

FIGS. 2-7 are used to discuss an example of the comparative mode, while FIGS. 9-13 are used to discuss an example of the analytic mode. For the example discussed with reference to FIGS. 2-7, it is assumed that the user has selected comparative mode. For the example discussed with reference to FIGS. 9-13, it is assumed that the user has selected analytic mode.

Although examples and illustrations may refer to spreadsheets, the CA lens tool may be used with any type of document.

In the comparative mode, the CA lens tool 110 provides a lens type view for comparing data in a spreadsheet against other data in the same spreadsheet or another spreadsheet. The CA lens tool 110 compares a selection of the data that the user wants to compare against what is in the view of the CA lens window. The formulas for comparison are user adjustable.

Figure 2:
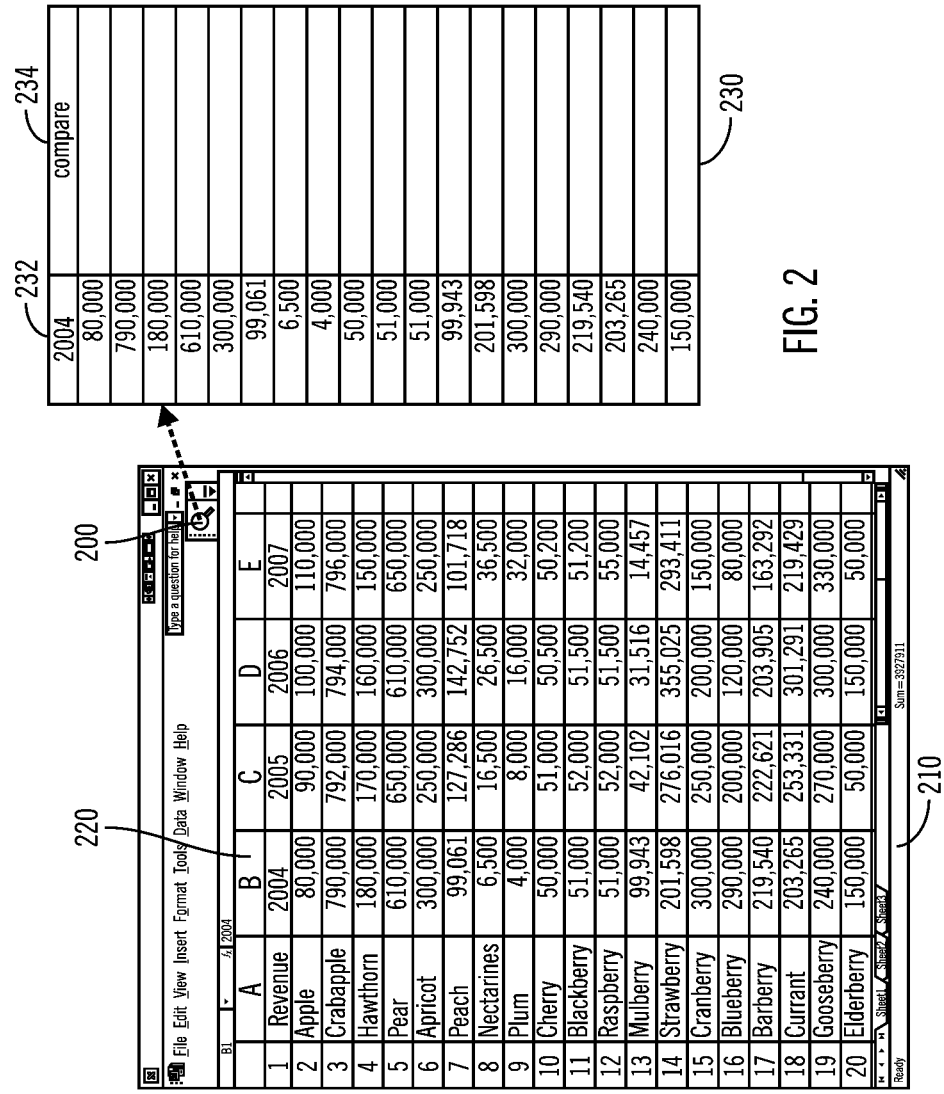
FIG. 2 illustrates selection of a CA lens window in accordance with certain embodiments.

FIG. 2 illustrates selection of a CA lens window in accordance with certain embodiments. In FIG. 2, the CA lens tool 110 provides a CA lens combo box 200 in a spreadsheet 210. The spreadsheet 210 includes columns and rows of data. In certain embodiments, a user may select the CA lens tool 110 by right clicking on the CA lens combo box 200.

A combo box may be described as a graphical user interface widget that is a combination of a drop-down list or list box and a single-line textbox and which allows the user to either type a value directly into the control or choose from the list of existing options. In certain embodiments, the CA lens tool 110 provides multiple CA lens windows associated with different pre-set configuration information (i.e., pre-configured CA lens windows). In such embodiments, the user may select a CA lens window from the multiple CA lens windows using the combo box 200. In response to the selection, the CA tool 110 displays a CA lens window with data based on the pre-set configuration information. In addition, the user may also use the combo box 200 to indicate that a new CA lens window is to be configured, and the CA lens tool 110 displays a CA configuration window.

Figure 3:
FIG. 3 illustrates a CA lens cursor in accordance with certain embodiments.

FIG. 3 illustrates a CA lens cursor 300 in accordance with certain embodiments. In various embodiments, the CA lens cursor 300 may be circular (resembling a magnifying lens) or may be any other shape.

"User selection" may be described as a situation in which a user selects data using a standard cursor or the CA lens cursor. "Lens selection" may be described as a situation in which the user hovers over data with the CA lens window. A user may "hover over" data using the CA lens window by placing any portion of the CA lens window over the data of the spreadsheet. The CA lens window may be a rectangular window or may have an associated graphic (which may be a circle, plus sign or other graphic) for allowing more accuracy with selections while hovering.

In certain embodiments, the user may make a selection of data (e.g., column B in the spreadsheet 200) using a standard cursor (which is referred to herein as user selection), then the user may choose a CA lens window from a combo box with a list of CA lens windows. In response to a user selecting a CA lens window, the CA lens tool 110 produces a pre-configured CA lens window or a CA configuration window for configuring a new CA lens window.

In other embodiments, in response to selection of a CA lens window from a combo box with a list of CA lens windows, the CA lens tool 110 changes the standard cursor to a CA lens cursor, and then the user selects new data with the CA lens cursor to produce a user selection. In response to user selection of data using the CA lens cursor, the CA lens tool 110 displays a CA lens window that compares previously selected data to the newly selected data.

In FIG. 2, a user has selected first data 220 (which is Column B in the spreadsheet 210). The user may select a new CA lens window (i.e., not pre-configured) from the combo box 200. In response to selection of a new CA lens window from the CA combo box, the CA lens tool 110 displays a CA configuration window 230. The CA configuration window 230 includes two columns: a data column 232 and a compare column 234. Because the user has already selected first data 220, the first data 220 is displayed in the data column 232 by default. The compare column 234 is used to store formulas for use in making comparisons.

In certain embodiments, the user may use the configuration window to provide configuration data to adjust the size of the CA lens window, transparency of the CA lens window, and other properties of the CA lens window.

Figure 4:
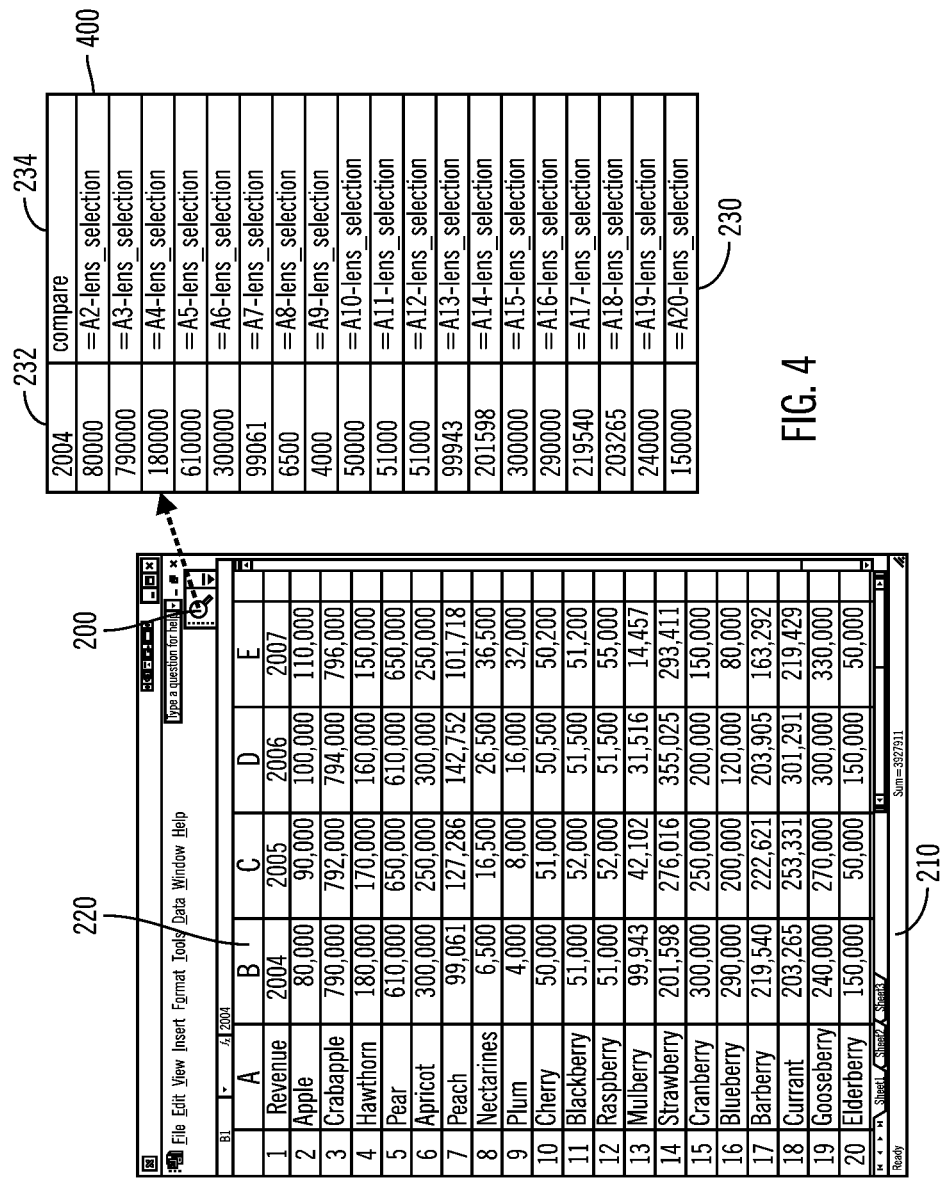
FIG. 4 illustrates configuration of a CA lens tool in accordance with certain embodiments.

FIG. 4 illustrates configuration of the CA lens tool 110 in a configuration window 230 in accordance with certain embodiments. The CA lens tool 110 receives user adjustments of comparison options. In particular, the user has filled out each row of the compare column 234 with a formula. In the compare column 234, the formulas represent a macro that substitutes the data under the CA lens window with difference values of A2 minus the lens selection. For example, for data "80000", the formula is =B2−lens_selection. In certain other embodiments, fully qualified references may be used,(e.g., sheetname.B2 so that if a user selects a different sheet, the reference will still be correct) or lens sheet.A2 may be used). In certain embodiments, the user indicates the entry of the adjustments of the comparison options is completed by filling in the compare column with formulas. The user is able to reference cells and columns under the CA lens window. In certain embodiments, once the formulas are entered, the values they represent will be displayed in the CA lens window. In certain embodiments, the CA configuration window 230 may also provide formula editing tools.

FIG. 5 illustrates a CA lens window 510 in accordance with certain embodiments. Once the user adjustments of the comparison options are received, the CA lens tool 110 displays the CA lens window 510. In this example, the CA lens tool 110 also provides a transparent, associated graphic 500. As the user hovers over new data in the spreadsheet 210 with the CA lens window 510, the new data is selected as second data, and the CA lens tool 110 displays the CA lens window 510 with a new report. The CA lens window 510 is a new window with the properties of a window (e.g., the CA lens window 510 may be moved, resized, etc.). The user may also hover over new data using the associated graphic 500 for more accuracy with selection.

The CA lens window may display any type of document. In certain embodiments, the CA lens window may display a floating, transparent document 120, such as a spreadsheet (having the properties of a spreadsheet) that can use formulas that reference any other part of the same spreadsheet or any other spreadsheet in a multi-sheet workbook, with the added capability of referencing values that the CA lens is floating over in the formulas. The CA lens window may be said to be floating as the CA lens window may be overlaid over a document. The CA lens window, the document displayed in the CA lens window, and the associated graphic may be said to be transparent (i.e., seen through) to some degree of transparency (e.g., 10%) to enable the user to know the context (i.e., where the user is) of the displayed document. A spreadsheet may be described as providing a worksheet that displays multiple cells, usually in a two-dimensional matrix or grid consisting of rows and columns. Each cell in the spreadsheet may contain alphanumeric text, numeric values or formulas. A formula may define how the content of that cell is to be calculated from the contents of any other cell (or combination of cells) each time any cell is updated. In certain embodiments, references in formulas may be specified statically to fixed locations or dynamically relative to a current selection or relative to the location of the CA lens window.

For example, in FIG. 5, the user has hovered over Column D of the spreadsheet 210, and the CA lens window 510 displays a column of data 512 with the first data (from Column B of the spreadsheet 210) and a compare column 514 with comparison data. For example, for row 520, with first data "80000", the formula =A2−lens_selection is applied to second data "100,000" (from Column D of the spreadsheet 210), and the compare column displays "−20,000" (i.e., "80000"−"100,000").

The CA lens window 510 may also be referred to as an operating view, while the CA configuration window 230 may also be referred to as a configuration view.

FIG. 6 illustrates user of graphic icons to enhance comparison in accordance with certain embodiments. In FIG. 6, graphics are used in the compare column 414 of the CA lens window 410 to illustrate the change in data. In this illustration, the graphics are arrows that point up or down to indicate the change in values. For example, for row 420, the graphic 600 is an arrow pointing down.

FIG. 7 illustrates a CA configuration window in accordance with certain embodiments. The CA configuration window 700 includes three columns: a data column 702, a compare column 704, and a compare indicator column 706. In this illustration, because the user has already selected first data, the first data is displayed in the data column 702 of the CA configuration window 700 by default. The compare column

704 is used to hold formulas for use in making comparisons. The compare indicator column 706 is used to hold information on which graphics to use and when to use them. For example, for row 710: 1) if the value is less then 0, then img1 is displayed; 2) if the value is greater than 0, then img2 is displayed; and 3) if the value equals 0, then img3 is displayed. Thus, via the CA configuration window 700, the user enters the information in the compare indicator column 710 to configure the graphics that are to be displayed in the CA lens window.

Figure 8A:
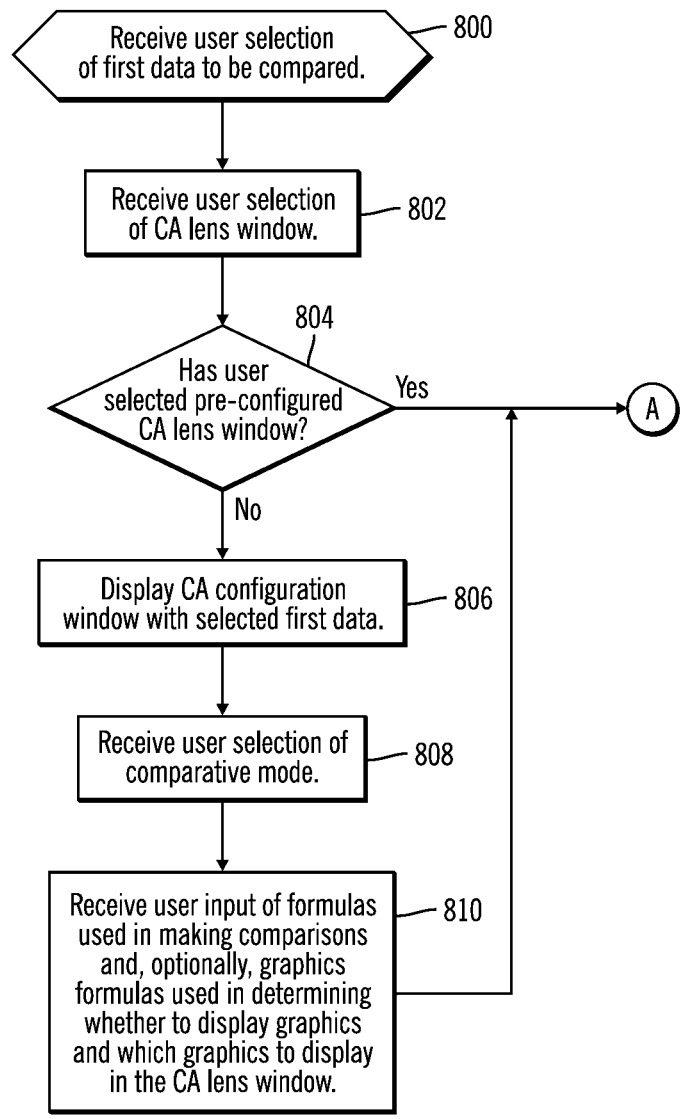
FIGS. 8A and 8B illustrate, in a flow diagram, logic for comparing data in accordance with certain embodiments.
Figure 8B:
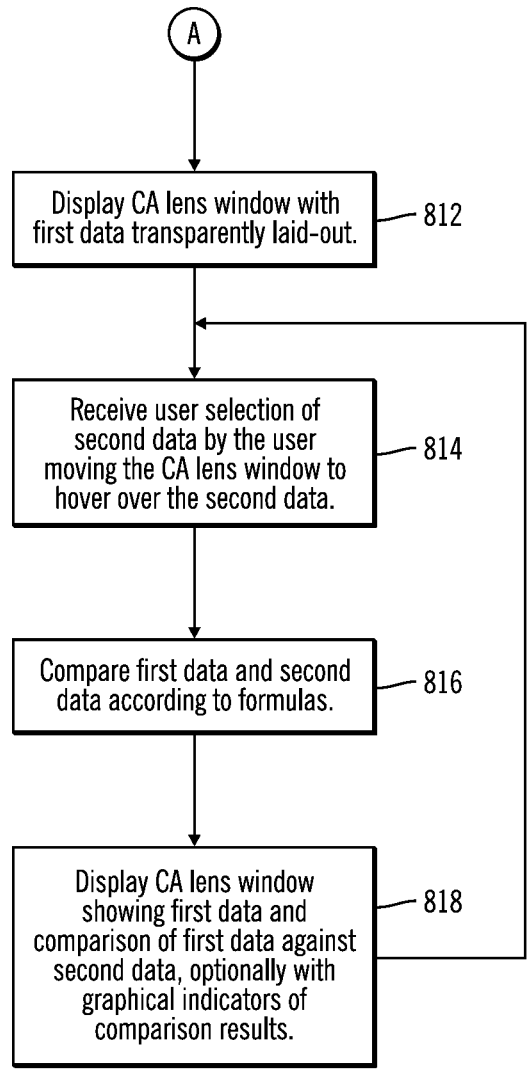

FIGS. 8A and 8B illustrate, in a flow diagram, logic for comparing data in accordance with certain embodiments. Control begins in block 800 with receipt of user selection of first data to be compared. In block 802, the CA lens tool 110 receives user selection of a CA lens window (either for a new CA lens window or for a pre-configured CA lens window via the combo box). In certain embodiments, the user may select data after selecting the CA lens. In block 804, the CA lens tool 110 determines whether the user has selected a pre-configured CA lens window. If so, processing continues to block 812 (FIG. 8B), otherwise, processing continues to block 806.

In block 806, the CA lens tool 110 displays the CA configuration window with the selected first data. In block 808, the CA tool 110 receives user selection of comparative mode. In block 810, the CA lens tool 110 receives user input of formulas used in making comparisons (i.e., user adjustments of the comparison options) and, optionally, graphics formulas used in determining whether to display graphics and which graphics to display in the CA lens window. From block 810, processing continues to block 812 (FIG. 8B).

In block 812, the CA lens tool 110 displays the CA lens window with the first data transparently laid-out. In block 814, the CA lens tool 110 receives user selection of second data by the user moving the CA lens window to hover over the second data. That is, the user moves the CA lens over second data in a same or different document to select the second data. In block 816, the CA lens tool 110 compares the first data and the second data according to the formulas. In block 818, the CA lens tool 110 displays the CA lens window showing the first data and the comparison of the first data against the second data (underneath the CA lens window), optionally with graphical indicators of the comparison results. From block 818, processing loops back to block 814. Because processing loops back to block 814, as the user moves the CA lens window, the analysis is updated and the CA lens window is updated with the analyzed data. In certain embodiments, the user may stop use of the CA lens window to exit this loop.

For example, in certain embodiments, the user makes a selection of the first data to compare, and adjusts the comparison options for the CA lens tool 110. Then, the CA lens tool 110 displays a CA lens window (for movement by the user to select second data). Once the second data is selected, the CA lens tool 110 updates the CA lens window to include the comparison data. Thus, as the user moves the CA lens window, the user selects second data and the CA lens window is updated. In real-time, the CA lens tool 110 displays the CA lens window showing the comparison of the first data against the second data underneath the CA lens window with, optionally, graphical indicators of the comparison results.

The CA lens tool 110 allows a user (e.g., of a spreadsheet) to compare first data against second, other data. The CA lens tool 110 prompts the user to make a selection in the spreadsheet of the first data, displays a new window containing the first data transparently laid-out, and allows the user to move the CA lens window across the spreadsheet or to a new spreadsheet, whereby, when the CA lens window hovers over the second data, the CA lens tool 110 instantly displays in the CA lens window a representation of the comparison between the first data and the second data.

The CA lens tool 110 allows the user to compare selections of first data to other, second data and to run any formula on the selections of the first data against the other, second data. The CA lens tool 110 does this without leaving a current view of the spreadsheet (e.g., a report view) and without changing the layout of the spreadsheet (e.g., report).

In analytic mode, the CA lens tool 110 provides analysis via a CA lens window. In analytic mode, the CA lens tool 110 performs a calculation of data under the CA lens window or CA lens cursor and presents that calculation in the CA lens window, In analytic mode, the CA lens tool 110 analyzes what falls under the CA lens window or CA lens cursor, as opposed to comparing the current selection with what is under the CA lens window or CA lens cursor. The formulas for analysis are user adjustable.

In certain embodiments, a CA lens window may be a floating, transparent spreadsheet (having the properties of a spreadsheet), which can use formulas that reference any other part of the same spreadsheet or any other spreadsheet in a multi-sheet workbook, with the added capability of referencing values that the CA lens is floating over in the formulas. The CA lens window may be said to be floating as the CA lens window may be overlaid over (i.e., floats over) a document. The CA lens window may be said to be transparent as (i.e., seen through) to some degree of transparency (e.g., 10%) to enable the user to know the context (i.e., where the user is) of the document.

Figure 9:
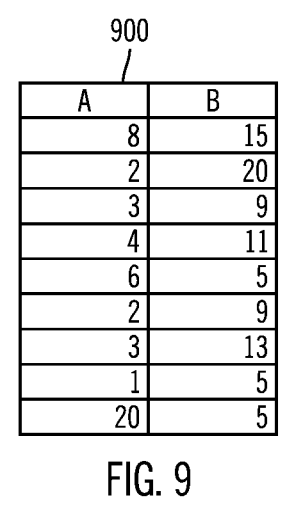

In certain embodiments, the CA lens can be programmed with a formula so that when the CA lens is moved over a region, the formula is evaluated. FIG. 9 illustrates a spreadsheet 900 in accordance with certain embodiments. Spreadsheet 9 includes column A and column B.

FIG. 10 illustrates a CA configuration window 1000 in accordance with certain embodiments. In this example, a user has not already selected data for analysis, so the CA configuration window 1000 includes an analysis column for storing formulas. If the user had selected data for analysis, the data would have been displayed in a column of the CA configuration window 1000. In certain embodiments, the CA configuration window 1000 may also provide formula editing tools. In FIG. 10, each row represents a lens formula that calculates a logarithm base 2 of data that is under the CA lens.

The CA lens window may also be referred to as an operating view, while the CA configuration window may also be referred to as a configuration view.

Figure 11:
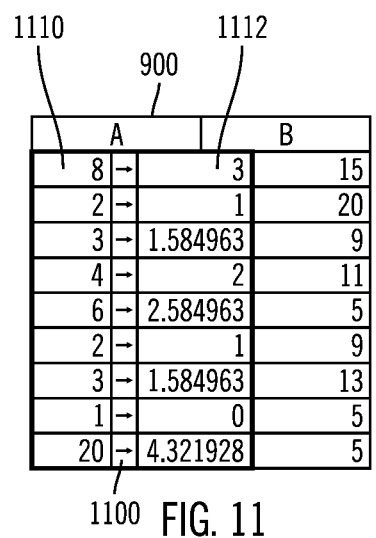
FIG. 11 illustrates a CA lens window in accordance with certain embodiments.

FIG. 11 illustrates a CA lens window 1100 in accordance with certain embodiments. In this example, the CA lens window 1100 is overlaid over the spreadsheet 900. Assume for this example that, after inputting the formulas into the CA configuration window 900, the user is hovering the CA lens over column A of the spreadsheet 900. Then, the CA lens tool 110 displays the CA lens window 1100. The CA lens window 1100 includes a column 1110 showing the values of column A of the spreadsheet 900 and a column 1112 showing the logs for the values in column 1110.

In certain embodiments, the CA configuration window includes multiple columns for storing different formulas, and the CA lens window includes multiple analysis columns for showing different calculations based on the formulas.

In certain embodiments, the CA lens tool 110 creates a new column from data being displayed under the CA lens and adds the new column to the spreadsheet. For example, if the user detects interesting data in a particular column of a spreadsheet that was just hovered over with the CA lens, then the user can just right click a transparent column of the CA lens window, and the CA lens tool 110 adds the data that is in that transparent column into the spreadsheet.

Figure 12:
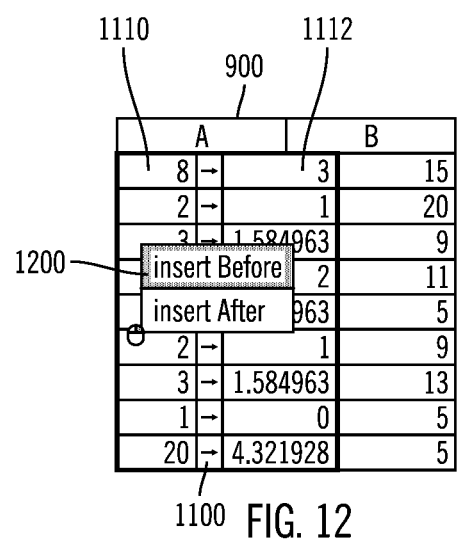
FIG. 12 illustrates selection of a new column in accordance with certain embodiments.

FIG. 12 illustrates selection of a new column in accordance with certain embodiments. In FIG. 12, a user has right-clicked a mouse in column 1112, and the CA lens tool 110 displays a selection box 1200 that allows the user to indicate whether column 1112 is to be added before or after column A of the spreadsheet 900.

FIG. 13 illustrates insertion of a new column 1300 in accordance with certain embodiments. Assume that the user has indicated that the column 1112 in the CA lens window 1100 is to be inserted after column A of the spreadsheet 900, then, in FIG. 13, the CA lens tool 110 inserts the data of column 1112 (as new column B 1300) into the spreadsheet 900 after column A. That is, the user decides to insert the logs calculations of column A right after column A, by right clicking on the CA lens window, and the user is presented with an option to insert before or after column A. The original column B from spreadsheet 900 (FIG. 9) is now column C (FIG. 13).

Figure 14A:
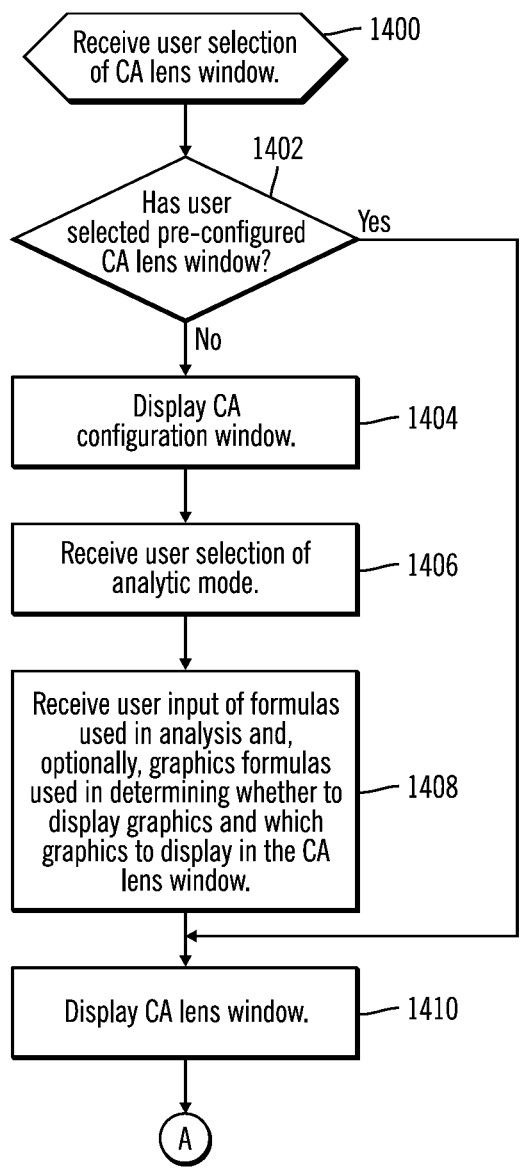
FIGS. 14A and 14B illustrate, in a flow diagram, logic for analyzing data in accordance with certain embodiments.
Figure 14B:
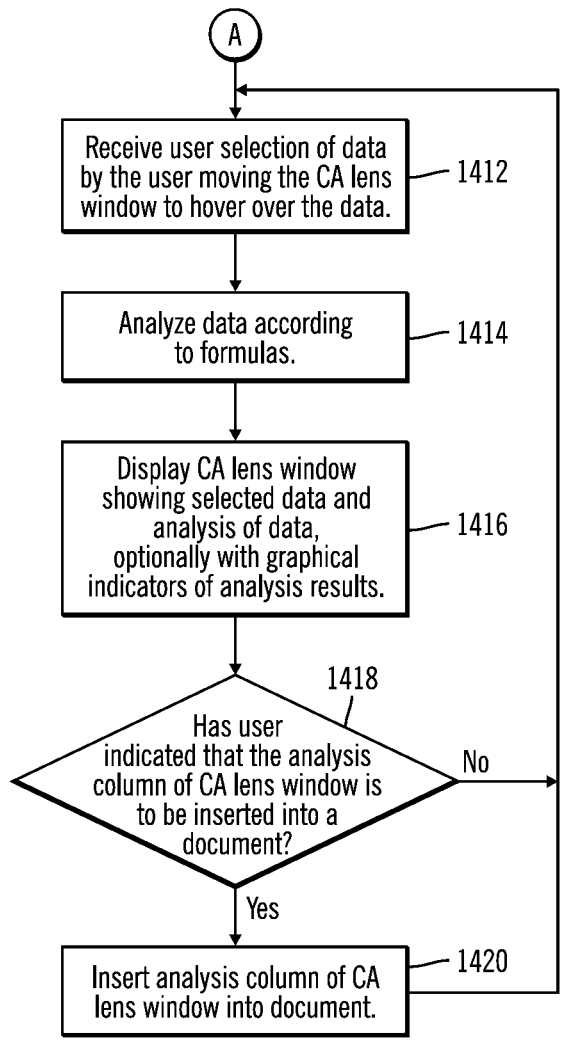

FIGS. 14A and 14B illustrate, in a flow diagram, logic for analyzing data in accordance with certain embodiments. Control begins in block 1400 with receipt of user selection of a CA lens window (either for a new CA lens window or for a pre-configured CA lens window via the combo box). In certain embodiments, the user may select data for analysis before the CA lens window is displayed.

In block 1402, the CA lens tool 110 determines whether the user has selected a pre-configured CA lens window. If so, processing continues to block 1410, otherwise, processing continues to block 1404. In block 1404, the CA lens tool 110 displays the CA configuration window. In block 1406, the CA lens tool receives user selection of analytic mode. In block 1408, the CA lens tool 110 receives user input of formulas used in analysis (i.e., user adjustments of the analysis options) and, optionally, graphics formulas used in determining whether to display graphics and which graphics to display in the CA lens window. In block 1410, the CA lens tool 110 displays a CA lens window. If the user has already selected data for analysis, the data is transparently laid-out in the CA lens window.

In block 1412, the CA lens tool 110 receives user selection of data by the user moving the CA lens window to hover over data. That is, the user moves the CA lens window over the first data. In block 1414, the CA lens tool 110 analyzes the data according to the formulas. In block 1416, the CA lens tool 110 displays the CA lens window showing the selected data and the analysis of the data, optionally with graphical indicators of the comparison results. In block 1418, the CA lens tool 110 determines whether the user has indicated that the analysis column of the CA lens window is to be inserted into a document. If so, processing continues to block 1420, otherwise, processing loops back to block 1412. In block 1420, the CA lens tool 110 inserts the analysis column of CA lens window into the document. From block 1420, processing loops back to block 1412. Because processing loops back to block 1412, as the user moves the CA lens window, the analysis is updated and the CA lens window is updated with the analyzed data. In certain embodiments, the user may stop use of the CA lens window to exit this loop.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The CA lens tool 110 may be implemented as hardware (e.g., hardware logic or circuitry), software, or a combination of hardware and software.

Figure 15:
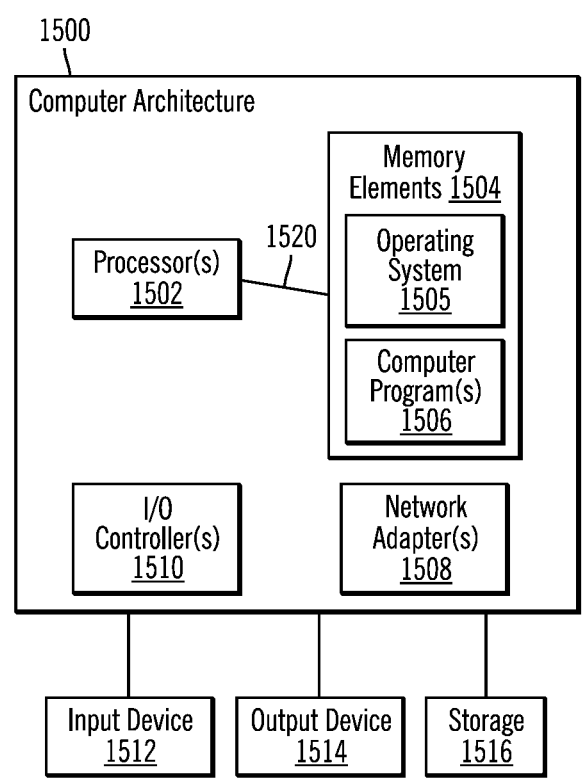
FIG. 15 illustrates, in a block diagram, a computer architecture that may be used in accordance with certain embodiments.

FIG. 15 illustrates a computer architecture 1500 that may be used in accordance with certain embodiments. Computing device 100 may implement computer architecture 1500. The computer architecture 1500 is suitable for storing and/or executing program code and includes at least one processor 1502 coupled directly or indirectly to memory elements 1504 through a system bus 1520. The memory elements 1504 may include local memory employed during actual execution of the program code, bulk storage, and cache memories which provide temporary storage of at least some program code in order to reduce the number of times code must be retrieved from bulk storage during execution. The memory elements 1504 include an operating system 1505 and one or more computer programs 1506.

Input/Output (I/O) devices 1512, 1514 (including but not limited to keyboards, displays, pointing devices, etc.) may be coupled to the system either directly or through intervening I/O controllers 1510.

Network adapters 1508 may also be coupled to the system to enable the data processing system to become coupled to other data processing systems or remote printers or storage devices through intervening private or public networks. Modems, cable modem and Ethernet cards are just a few of the currently available types of network adapters 1508.

The computer architecture 1500 may be coupled to storage 1516 (e.g., a non-volatile storage area, such as magnetic disk drives, optical disk drives, a tape drive, etc.). The storage 1516 may comprise an internal storage device or an attached or network accessible storage. Computer programs 1506 in storage 1516 may be loaded into the memory elements 1504 and executed by a processor 1502 in a manner known in the art.

The computer architecture 1500 may include fewer components than illustrated, additional components not illustrated herein, or some combination of the components illustrated and additional components. The computer architecture 1500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for comparing data, comprising:
receiving user selection of first data to be compared from a first document;
storing a configuration window including a first column for storing the first data, a second column for storing one or more formulas used in making comparisons, and a third column for storing information on graphics to use for the second column and when to use the graphics;
allowing the user to move a Comparative and Analytic (CA) lens window to float over second data from a second document, wherein the CA lens window is transparent and includes a first column for showing the first data and a second column for showing comparison values for the first data and the second data with the graphics; and
in response to the CA lens floating over the second data, in real-time,
comparing the first data and the second data according to the one or more formulas; and
displaying the CA lens window showing the first data in the first column and comparison values between the first data and the second data in the second column with the graphics showing whether the data in the first column has one of increased and decreased.

2. The method of claim 1, wherein the first document and the second document are a same spreadsheet, and wherein the first data and the second data are selected from a spreadsheet and further comprising:
displaying the comparison without leaving a current view of the spreadsheet and without changing a layout of the spreadsheet.

3. The method of claim 1, wherein the first document and the second document are different documents.

4. The method of claim 1, further comprising:
providing a CA lens cursor that is circular for use in selecting the second data.

5. The method of claim 1, further comprising:
receiving user input of one or more graphics formulas used in determining whether to display the graphics and which graphics to display in the CA lens window; and
displaying the CA lens window with the graphics based on the one or more graphics formulas.

6. The method of claim 1, further comprising:
receiving user selection of an analytic mode;
receiving user input of one or more formulas used in analysis;
allowing the user to move the CA lens window to float over new data to select the new data for analysis; and
in response to the CA lens floating over the new data, in real-time,
analyzing the selected new data according to the one or more formulas; and
displaying a CA lens window showing the new data and the analysis.

7. A system for comparing data, comprising:
a processor; and
storage coupled to the processor, Wherein the storage stores a computer program, and wherein the processor is configured to execute the computer program to perform operations, wherein the operations comprise:
receiving user selection of first data to be compared from a first document;
storing a configuration window including a first column for storing the first data, a second column for storing one or more formulas used in making comparisons, and a third column for storing information on graphics to use for the second column and when to use the graphics;
allowing the user to move a Comparative and Analytic (CA) lens window to float over second data from a second document, wherein the CA lens window is transparent and includes a first column for showing the first data and a second column for showing comparison values for the first data and the second data with the graphics; and
in response to the CA lens floating over the second data, in real-time,
comparing the first data and the second data according to the one or more formulas; and
displaying the CA lens window showing the first data in the first column and comparison values between the first data and the second data in the second column with the graphics showing whether the data in the first column has one of increased and decreased.

8. The system of claim 7, wherein the first document and the second document are a same spreadsheet, wherein the first data and the second data are selected from a spreadsheet, and wherein the operations further comprise:
displaying the comparison without leaving a current view of the spreadsheet and without changing a layout of the spreadsheet.

9. The system of claim 7, wherein the first document and the second document are different documents.

10. The system of claim 7, wherein the operations further comprise:
providing a CA lens cursor that is circular for use in selecting the second data.

11. The system of claim 7, wherein the operations further comprise:
receiving user input of one or more graphics formulas used in determining whether to display the graphics and which graphics to display in the CA lens window; and
displaying the CA lens window with the graphics based on the one or more graphics formulas.

12. The system of claim 7, wherein the operations further comprise:
receiving user selection of an analytic mode;
receiving user input of one or more formulas used in analysis;
allowing the user to move the CA lens to float over the selected new data for analysis; and
in response to the CA lens floating over the selected new data, in real-time,
analyzing the selected new data according to the one or more formulas; and
displaying a CA lens window showing the selected new data and the analysis.

13. A computer program product for comparing data, the computer program product comprising:
a non-transitory computer readable storage medium having computer readable program code embodied therewith, the computer readable program code comprising:
computer readable program code, when executed by a processor of a computer, configured to perform:
receiving user selection of first data to be compared from a first document;
storing a configuration window including a first column for storing the first data, a second column for storing one or more formulas used in making comparisons, and a third column for storing information on graphics to use for the second column and when to use the graphics;

allowing the user to move a Comparative and Analytic (CA) lens window to float over second data from a second document, wherein the CA lens window is transparent and includes a first column for showing the first data and a second column for showing comparison values for the first data and the second data with the graphics; and in response to the CA lens floating over the second data, in real-time,
  comparing the first data and the second data according to the one or more formulas; and
  displaying the CA lens window showing the first data in the first column and comparison values between the first data and the second data in the second column with the graphics showing whether the data in the first column has one of increased and decreased.

14. The computer program product of claim 13, wherein the first document and the second document are a same spreadsheet, and wherein the first data and the second data are selected from a spreadsheet, and wherein the computer readable program code, when executed by the processor of the computer, is configured to perform:
  displaying the comparison without leaving a current view of the spreadsheet and without changing a layout of the spreadsheet.

15. The computer program product of claim 13, wherein the first document and the second document are different documents.

16. The computer program product of claim 13, wherein the computer readable program code, when executed by the processor of the computer, is configured to perform:
  providing a CA lens cursor that is circular for use in selecting the second data.

17. The computer program product of claim 13, wherein the computer readable program code, when executed by the processor of the computer, is configured to perform:
  receiving user input of one or more graphics formulas used in determining whether to display the graphics and which graphics to display in the CA lens window; and
  displaying the CA lens window with the graphics based on the one or more graphics formulas.

18. The computer program product of claim 13, wherein the computer readable program code, when executed by the processor of the computer, is configured to perform:
  receiving user selection of an analytic mode;
  receiving user input of one or more formulas used in analysis;
  allowing the user to move the CA lens to float over the selected new data for analysis; and
  in response to the CA lens floating over the selected new data, in real-time,
    analyzing the selected new data according to the one or more formulas; and
    displaying a CA lens window showing the selected new data and the analysis.

* * * * *